United States Patent
Tallio et al.

(10) Patent No.: US 6,408,686 B1
(45) Date of Patent: Jun. 25, 2002

(54) EXHAUST SYSTEM MONITOR

(75) Inventors: Kevin Verne Tallio, Saline; Timothy Chanko, Canton, both of MI (US); Yitzhak Isaac Henig, Essex (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/479,547

(22) Filed: Jan. 7, 2000

(51) Int. Cl.$^7$ .............................................. G01M 19/00
(52) U.S. Cl. ...................................................... 73/118.1
(58) Field of Search ................................ 73/118.1, 116, 73/118.2; 60/274, 277–278; 701/108; 123/119 A

(56) References Cited

U.S. PATENT DOCUMENTS

| | | | |
|---|---|---|---|
| 3,794,006 A | * 2/1974 | Woodward | 123/119 |
| 4,302,814 A | * 11/1981 | Full et al. | 73/116 |
| 4,747,264 A | * 5/1988 | Santiago et al. | 60/274 |
| 4,986,069 A | * 1/1991 | Barris et al. | 60/274 |
| 5,511,413 A | * 4/1996 | Pfister et al. | 73/118.1 |
| 6,164,270 A | * 12/2000 | Bidner et al. | 73/118.1 |
| 6,308,130 B1 | * 10/2001 | Vojtisek-Lom | 73/118.1 |

FOREIGN PATENT DOCUMENTS

| EP | 0 196 421 | 10/1986 |
|---|---|---|
| JP | 7 26933 | 1/1995 |

* cited by examiner

*Primary Examiner*—Benjamin R. Fuller
*Assistant Examiner*—Maurice Stevens

(57) ABSTRACT

A method of monitoring exhaust gas flow through an exhaust system of an internal combustion engine comprising the steps of generating a flow efficiency value ($K_E$), comparing the flow efficiency value to a reference efficiency value, and if the reference efficiency value is exceed by a predetermined amount, then setting a flow fault indicator flag. In one aspect of the invention, the flow efficiency value is generated as a ratio of the magnitude of the exhaust gas flow restriction, and the mass flux through the engine. The magnitude of the exhaust gas flow restriction is represented by the pressure drop across the exhaust system, and the mass flux through the engine is determined as a function of the mass airflow rate and exhaust gas density. The resulting flow efficiency value ($K_E$) is a non-dimensional parameter that characterizes the level of restriction in the exhaust system independent of the engine operating conditions.

12 Claims, 1 Drawing Sheet

EXHAUST SYSTEM MONITOR

TECHNICAL FIELD

The present invention is directed to an exhaust system monitor for internal combustion engines, and more particularly, concerns a method of monitoring exhaust gas flow and detecting leaks and undesired exhaust system back-pressure due to catalyst and/or exhaust component plugging.

BACKGROUND ART

There exists a need for rapidly evaluating the extent to which exhaust gas flowing through an exhaust system and its corresponding components is restricted. Exhaust gas flow restrictions can adversely affect engine performance in both gasoline and diesel engines. Exhaust gas after-treatment systems for diesel engines, in particular, are susceptible to exhaust gas flow restriction due to plugging, among other things. This is primarily a due to the harsh operating environments of diesel engines resulting from the levels of particulate matter produced during the combustion process. Mufflers, catalyst systems, and emissions components such as traps as well as other after-treatment systems can, over time, become plugged with particulate matter rendering them ineffective or, at least, less efficient. A potential for problems associated with plugging and/or restricted exhaust gas flow also exists for gasoline direct injected engines because of the potential for soot production, for example.

A simple exhaust system back pressure measurement provides a direct measure of the level of restriction within the exhaust system at a fixed engine operating condition, i.e., speed and load. However, during normal engine operation, the speed and load vary over a wide range making simple back-pressure measurements useless for evaluating the level of degradation of the exhaust system components. Although look-up tables can be developed for evaluating the level of degradation of the exhaust system components as it relates to exhaust system back-pressure, they require significant calibration efforts and consume significant memory resources within the electronic engine controller.

In addition to monitoring exhaust gas flow restrictions which may adversely affect engine performance, there exists a need to monitor the integrity of the exhaust system components themselves.

For example, leaks in exhaust system components such as mufflers or catalysts can adversely affect emissions control compliance.

SUMMARY OF THE INVENTION

It is an object of the present invention to provide an improved exhaust system monitor. Another object of the invention is to provide a method of rapidly evaluating the extent to which the exhaust gas flow through exhaust system components is restricted. Another object of the invention is to provide an exhaust system monitor capable of monitoring the integrity of exhaust system components.

According to the present invention, the foregoing and other objects and advantages are attained by a method of monitoring exhaust gas flow through an exhaust system of an internal combustion engine. The method comprises the steps of generating a flow efficiency value, comparing the flow efficiency value to a reference efficiency value, and if the reference efficiency value is exceed by a predetermined amount, then setting a flow fault indicator flag. In one aspect of the invention, the flow efficiency value is generated as a ratio of the magnitude of the exhaust gas flow restriction, and the mass flux through the engine. The magnitude of the exhaust gas flow restriction is represented by the pressure drop across the exhaust system, and the mass flux through the engine is determined as a function of the mass airflow rate and exhaust gas density.

In another aspect of the invention, a system for determining exhaust gas flow efficiency in an exhaust system of an internal combustion engine comprises a first pressure sensor in operative communication with ambient air for generating a barometric pressure value ($P_{amb}$); a second pressure sensor located within the exhaust system for generating an exhaust system pressure value ($P_e$); and a temperature sensor located within the exhaust system for generating an exhaust gas temperature value. The system further includes a mass airflow sensor located proximate the intake manifold of the engine for generating a mass airflow value ($m_i$). An engine control unit for determining the exhaust gas flow efficiency is also included. The engine control unit includes a microprocessor programmed to generate a flow efficiency value ($K_E$) as a function of the barometric pressure value, exhaust system pressure value, exhaust gas temperature value and mass airflow value.

One advantage of the present invention is that it eliminates the need to generate and store look-up tables related to exhaust system performance. Another advantage of the present invention is that it can identify leaks in exhaust system components and thereby improve emissions control compliance. Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF A PREFERRED EMBODIMENT

Figure 1:
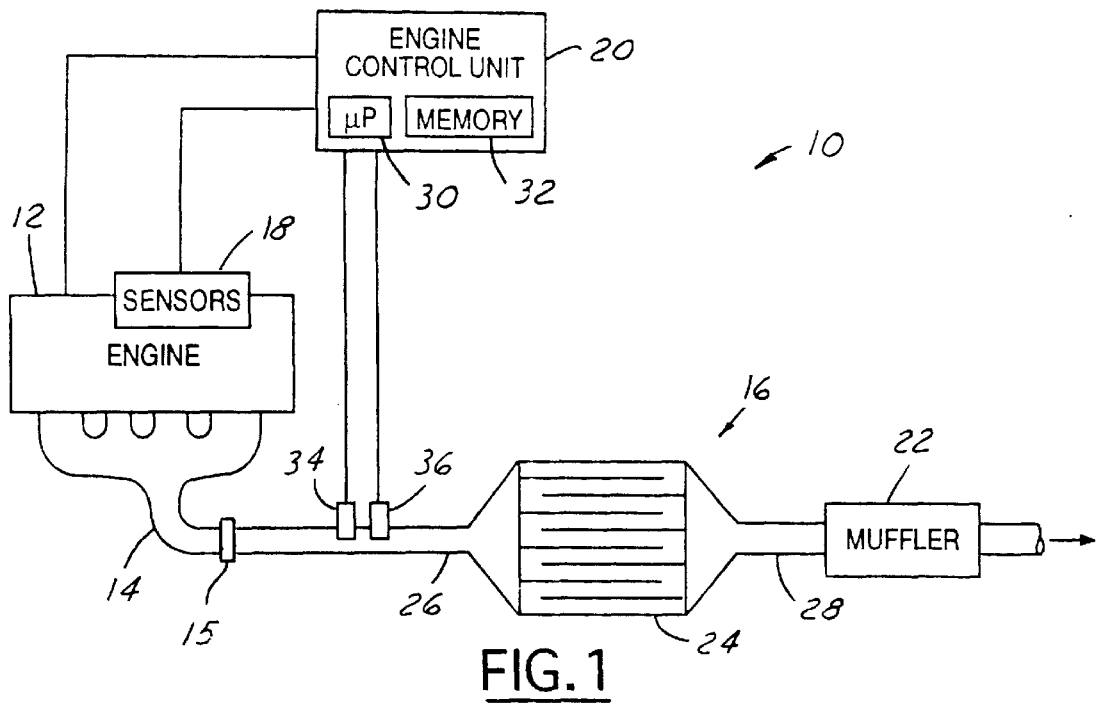
FIG. 1 shows a block diagram of an exhaust system monitor according to one embodiment of the present invention in operational relationship to an engine.

Turning first to first to FIG. 1, there is shown a block diagram of an exhaust system monitor 10. The exhaust system monitor 10 is illustrated in operational relationship with an internal combustion engine 12 such as a direct-injected diesel engine for an automotive vehicle. The engine 12 has an exhaust manifold 14 to direct exhaust gases from the engine 12 to the exhaust system 16.

The engine 12 includes sensors, indicated generally at 18, for providing information about engine performance to the engine control unit 20. Such information includes the crankshaft position, angular velocity, throttle position, air temperature, engine coolant temperature, etc. The sensor set 18 also includes a mass airflow (MAF) sensor and barometric pressure sensor. The information from the sensors 18 is used by the engine control unit 20 to control operation of the engine 12.

The exhaust system 16 is coupled to the exhaust manifold 14 by way of an exhaust flange 15. Exhaust system 16 includes such things as a muffler 22, and $NO_x$ trap 24, for example. Of course, depending upon the particular exhaust system configuration, additional after-treatment systems may also be included in the exhaust system 16 such as additional catalysts, traps, mufflers, heaters, reductant injectors, and/or bypass valves. The exhaust system 16 may also branch into two or more exhaust systems upstream of the catalyst or trap 24 in the region 26, or after the catalyst or trap 24 in region 28. The particular components, which comprise the exhaust system 16, however, are not critical to the present monitoring method. Thus, it is to be understood that the exhaust system 16 may comprise any number or combination of exhaust system components. The present exhaust system monitor only concerns the exhaust gas flow through the exhaust system 16, whatever the form it may take.

The engine control unit 20 is preferably a microprocessor-based controller which provides integrated control of the engine 12 and transmission (not shown), among other things. Of course, the present invention may be implemented in a separate controller depending upon the particular application. The engine control unit 20 includes a microprocessor 30 in communication with input ports and output ports and associated memory 32. The memory 32 may include various types of volatile and non-volatile memory such as random access memory (RAM), read-only memory (ROM), and keep-alive memory (KAM). These functional descriptions of the various types of volatile and non-volatile storage may be implemented by a number of known physical devices including, but not limited to, EPROMs, EEPROMs, PROMs, flash memory and the like.

The exhaust system monitor further includes a pressure sensor 34 and temperature sensor 36 closely coupled downstream of the exhaust manifold 14.

Figure 2:
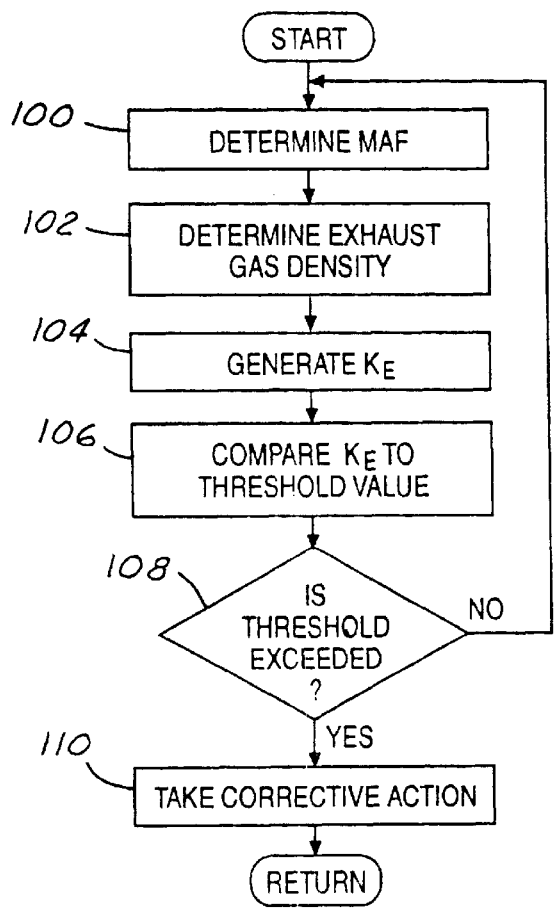
FIG. 2 shows a logic flow diagram illustrating a method of monitoring exhaust gas flow through an exhaust system in accordance with one embodiment of the present invention.

The exhaust system monitor will now be described with reference to FIGS. 1 and 2. FIG. 2 shows a logic flow diagram of one method of monitoring the exhaust gas flow through the exhaust system 16. The present method computes a non-dimensional parameter ($K_E$) which characterizes the efficiency of exhaust gas flow in the exhaust system. The method compares the magnitude of the exhaust gas flow restriction, defined in terms of the exhaust system pressure drop, with the mass flux through the engine, as measured by a mass airflow sensor. A mass airflow sensor (MAF) is a commonly used engine sensor and is represented in FIG. 1 by the conventional engine sensor set 18. The ratio of the magnitude of exhaust gas flow restriction to the mass flux through the engine results in a direct measure of the flow efficiency of the exhaust system, independent of the engine operating conditions (speed and load). This ratio is computed within the engine control unit 20 and compared to a pre-determined reference or threshold value. When the threshold value is exceeded, the system alerts the vehicle operator and/or initiates corrective action. In particular, when an upper threshold is exceeded, the system indicates exhaust component plugging; whereas exceeding a lower threshold indicates unrestricted flow due to, for example, a leak in the exhaust system.

Referring to FIG. 2, the mass flow rate ($m_i$) of air into the engine intake as measured by the mass airflow sensor is determined at step 100. In step 102, the exhaust gas density ($p_e$) is computed from the measured exhaust gas temperature and exhaust gas pressure as provided by sensors 34 and 36 of FIG. 1. Alternatively, estimates of these parameters based upon engine operating conditions can be made available from the engine control unit 20. From the values determined for the mass flow rate and exhaust gas density, the mass flux (F) through the engine can be determined as follows:

$$F=k(dm_i/dt)^2/2p_e \qquad (1)$$

where the k is an empirical constant related to the appropriate flow area of the exhaust pipe.

The pressure drop across the exhaust system components is represented as follows:

$$dP=P_e-P_{amb} \qquad (2)$$

where $P_e$ represents the pressure measured in the exhaust system by sensor 34 and $P_{amb}$ represents the barometric pressure as measured by the barometric pressure sensor. Like the MAF sensor, the barometric pressure ($P_{amb}$) is also typically available to the engine control unit 20 and included as part of the conventional engine sensor set represented by 18 in FIG. 1.

In step 104, the non-dimensional variable characterizing the flow efficiency, $K_E$, is then computed as the ratio of the magnitude of the exhaust gas flow restriction defined in terms of the exhaust system pressure drop, and the mass flux through the engine as determined by the mass airflow sensor and exhaust gas density. Accordingly, the flow efficiency value is computed as follows:

$$K_E=dP/F \qquad (3)$$

The value obtained for the flow efficiency $K_E$ is then compared to a threshold value at step 106. The threshold value represents, for example, a multiple or percent increase or decrease in the flow restriction as compared to a reference $K_E$. The reference $K_E$ represents the value of $K_E$ with new exhaust system components, for instance. In step 108, when the threshold value is exceeded, it is used to signal that the excessive plugging of the exhaust system has occurred or that the exhaust gas flow is otherwise restricted by a significant amount. Exceeding the lower threshold value represents that the integrity of the exhaust system has been affected. For example, a leak may have occurred. In either case, when the threshold value is exceeded, a flow indicator flag is set. Corrective action can then be taken at step 110 such as alerting the vehicle operator by a illuminating a malfunction indicator light in the vehicle cockpit and/or taking some other corrective action such as particulate filter regeneration.

From the foregoing, it will seen that there has been brought to the art a new and improved exhaust system monitor which has advantages over conventional exhaust system monitors. While the invention has been described in connection with one or more embodiments, it will be understood that the invention is not limited to those embodiments. On the contrary, the invention covers all alternatives, modifications and equivalents as may be included within the spirit and scope of the appended claims.

What is claimed is:

1. A method of monitoring exhaust gas flow through an exhaust system of an internal combustion engine including at least an exhaust gas aftertreatmen device, the method comprising the steps of:

generating a flow efficiency value as a ratio of a magnitude of exhaust gas flow restriction and mass flux through the engine;

comparing said flow efficiency value to a reference efficiency value; and if the reference efficiency value is exceeded by a predetermined amount, then setting a flow efficiency indicator flag.

2. The method according to claim 1 wherein the step of determining a flow efficiency value as a ratio of a magnitude of the exhaust gas flow restriction and mass flux though the engine includes computing the magnitude of the exhaust gas flow efficiency as a pressure drop acros the exhaust system.

3. The method according to claim 2 wherein the step of computing the magnitude of the exhaust gas flow restriction as a pressure drop across the exhaust system includes the steps of:

receiving a barometric pressure value from a first pressure sensor;

receiving an exhaust system pressure value from a second pressure sensor; and calculating a difference between the exhaust system pressure and barometric pressure values.

4. The method according to claim 1 wherein the step of determining a flow efficiency value as a ratio of a magnitude of the exhaust gas flow restriction and mass flux through the engine includes computing a mass flux through the engine as a function of the mass airflow rate through the engine as determined by a mass airflow sensor.

5. A method of monitoring exhaust gas flow through an exhaust system of an internal combustion engine including at least an exhaust gas aftertreatment device, the method comprising the steps of:

determining a mass airflow value ($m_i$) from a mass airflow sensor;

determining an exhaust gas density value ($p_e$);

calculating a mass flux (F) through the engine as a function of the mass airflow rate through the engine as determined by the mass airflow sensor according to the following equation:

$$F=k(dm_i/dt)^2/2p_e$$

where k represents a characteristic flow area of the exhaust system;

generating a flow efficiency value as a ratio of a magnitude of exhaust gas flow restriction and mass flux through the engine;

comparing said flow efficiency value to a reference efficiency value; and if the reference efficiency value is exceeded by a predetermined amount, then setting a flow efficiency indicator flag.

6. The method according to claim 5 further comprising the step of taking corrective action to mitigate a restriction in the exhaust gas flow in response to setting the flow restriction indicator flag.

7. A method of monitoring efficiency of exhaust gas flow through an exhaust system of an internal combustion engine comprising the steps of:

receiving a barometric pressure value ($P_{amb}$) from a first pressure sensor;

receiving an exhaust system pressure value ($P_e$) from a second pressure sensor;

receiving an exhaust gas temperature value from a temperature sensor;

receiving a mass airflow value ($m_i$) from an intake mass airflow sensor;

determining a magnitude of a pressure drop (dP) across the exhaust system as a function of the barometric and exhaust system pressure values;

determining a mass flux (F) through the engine as a function of the mass airflow value, exhaust system pressure value, and temperature value;

calculating an exhaust gas flow efficiency value ($K_E$) as a ratio of the pressure drop across the exhaust system and the mass flux through the engine; and determining a level of exhaust gas flow efficiency as a function of the exhaust gas flow efficiency value ($K_E$).

8. The method according to claim 7 wherein the step of determining a mass flux through the engine includes calculating the mass flux (F) through the engine according to the following equation:

$$F=k(dm_i/dt)^2/2p_e$$

where k represents a characteristic flow area of the exhaust system and $p_e$ represents the exhaust gas density.

9. The method according to claim 7 wherein the step of determining a level of exhaust gas flow efficiency as a function of the exhaust gas flow efficiency value ($K_E$) includes the steps of generating a reference efficiency value indicative of normal exhaust gas flow, and comparing the reference efficiency value and exhaust gas flow efficiency value.

10. A system for determining exhaust gas flow efficiency in an exhaust system of an internal combustion engine comprising:

a first pressure sensor in operative communication with ambient air for generating a barometric pressure value ($P_{amb}$);

a second pressure sensor located within the exhaust system for generating an exhaust system pressure value ($P_e$);

a temperature sensor located within the exhaust system for generating an exhaust gas temperature value;

a mass airflow sensor located proximate an intake manifold of the internal combustion engine for generating a mass airflow value ($m_i$); and an engine control unit including a microprocessor programmed to perform the step of generating a flow efficiency value ($K_E$) as a function of the barometric pressure value, exhaust system pressure value, exhaust gas temperature value and mass airflow value.

11. The system of claim 10 wherein the microprocessor in further programmed to perform the following steps:

determine the magnitude of a pressure drop (dP) across the exhaust system as a function of the barometric and exhaust system pressure values;

determine a mass flux (F) through the engine as a function of the mass airflow value, exhaust system pressure value, and exhaust gas temperature value; and calculate an exhaust gas flow efficiency value ($K_E$) as a ratio of the pressure drop across the exhaust system and the mass flux through the engine.

12. The system of claim 10 further comprising a operator indicator light operable in response to a flow efficiency value ($K_E$) exceeding a predetermined threshold value.

* * * * *